US010528181B2

(12) United States Patent
Yeh et al.

(10) Patent No.: US 10,528,181 B2
(45) Date of Patent: Jan. 7, 2020

(54) TOUCH CONTROLLING METHOD, ELECTRONIC DEVICE AND NON-TRANSITORYCOMPUTER-READABLE RECORDING MEDIUM

(71) Applicant: ASUSTeK COMPUTER INC., Taipei (TW)

(72) Inventors: Chun-Tsai Yeh, Taipei (TW); Hung-Yi Lin, Taipei (TW); Jung-Hsing Wang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/979,812

(22) Filed: May 15, 2018

(65) Prior Publication Data
US 2018/0335887 A1  Nov. 22, 2018

(30) Foreign Application Priority Data
May 19, 2017 (TW) .............................. 106116751 A

(51) Int. Cl.
*G06F 3/041* (2006.01)
*G06F 3/044* (2006.01)
*G06F 3/0354* (2013.01)

(52) U.S. Cl.
CPC ........ *G06F 3/0416* (2013.01); *G06F 3/03547* (2013.01); *G06F 3/044* (2013.01)

(58) Field of Classification Search
CPC .... G06F 3/0416; G06F 3/044; G06F 3/03547; G06F 3/048; G06F 3/0484; G06F 2203/04808
See application file for complete search history.

(56) References Cited

U.S. PATENT DOCUMENTS

| 9,939,957 B2* | 4/2018 | Chiang ................. G06F 3/0418 |
| 2011/0105187 A1* | 5/2011 | Dobroth ............... G06F 3/0481 455/566 |
| 2012/0162111 A1* | 6/2012 | Lee ....................... G06F 3/0416 345/173 |
| 2016/0291794 A1* | 10/2016 | Kawamura ........... G06F 3/0485 |

FOREIGN PATENT DOCUMENTS

| CN | 102023772 A | 4/2011 |
| CN | 105022561 A | 11/2015 |
| TW | 201636818 A | 10/2016 |
| TW | 201709030 A | 3/2017 |

* cited by examiner

*Primary Examiner* — Roy P Rabindranath
(74) *Attorney, Agent, or Firm* — McClure, Qualey & Rodack, LLP

(57) ABSTRACT

A touch controlling method, an electronic device, and a non-transitory computer-readable recording medium are disclosed. The touch controlling method includes: sensing a first touch on the touchpad; sensing a static contact area of the first touch when the first touch is static; and triggering a first click operation when the static contact area of the first touch exceeds a first area threshold.

9 Claims, 6 Drawing Sheets

TOUCH CONTROLLING METHOD, ELECTRONIC DEVICE AND NON-TRANSITORYCOMPUTER-READABLE RECORDING MEDIUM

CROSS-REFERENCE TO RELATED APPLICATION

This application claims the priority benefit of Taiwan application serial No. 106116751, filed on May 19, 2017. The entirety of the above-mentioned patent application is hereby incorporated by reference herein and made a part of specification.

BACKGROUND OF THE INVENTION

Field of the Invention

The disclosure relates to an electronic device and a touch controlling method thereof.

Description of the Related Art

With the development of technology, electronic devices with touch functions have been widely used in daily life.

A touchpad of an electronic device senses finger gestures of a user to perform corresponding operations. In some approaches, corresponding operations are determined by sensing user's touch pressure or tapping interval. However, the former needs to dispose additional pressure sensing devices, while the latter hardly accurately trigger the corresponding operation due to the setting of the tapping interval.

BRIEF SUMMARY OF THE INVENTION

According to first aspect of the disclosure, an electronic device with a processor is provided. The processor is electronically connected with a touchpad and configured to perform steps of: sensing a first touch on the touchpad; sensing a static contact area of the first touch when the first touch is static; and triggering a first click operation when the static contact area of the first touch exceeds a first area threshold.

According to second aspect of the disclosure, a touch controlling method applied to an electronic device electrically connected to a touchpad is provided. The touch controlling method comprises: sensing a first touch on the touchpad; sensing a static contact area of the first touch when the first touch is static; and triggering a first click operation when the static contact area of the first touch exceeds a first area threshold.

According to third aspect of the disclosure, a non-transitory computer-readable recording medium is provided. The non-transitory computer-readable recording medium is configured to record at least one program instruction. After the program instructions are loaded into an electronic device having or electrically connected with a touchpad, the electronic device executes the following steps: sensing a first touch on the touchpad; sensing a static contact area of the first touch when the first touch is static; and triggering a first click operation when the static contact area of the first touch exceeds a first area threshold.

DETAILED DESCRIPTION OF THE EMBODIMENTS

Figure 1:
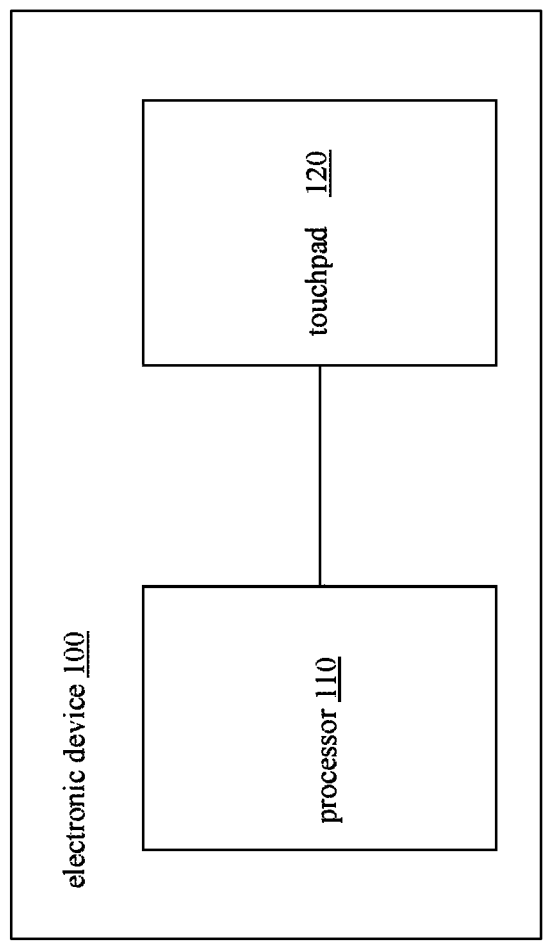
FIG. 1 is a schematic diagram of an electronic device in an embodiment.

FIG. 1 is a schematic diagram of an electronic device 100 in an embodiment. In the embodiment, the electronic device 100 includes a processor 110. In the embodiment, the electronic device 100 further includes a touch pad 120. The touchpad 120 is disposed on the electronic device 100 and electrically connected with the processor 110. In other embodiment, the touchpad 120 is electrically connected to the electronic device 100 in an external manner.

In the embodiment, the processor 110 is a central processing unit (CPU) or a microprocessor. The touchpad 120 is any touch-sensing element, such as a capacitive touchpad.

In an embodiment, the processor 110 is used to sense a single point touch on the touchpad 120. The processor 110 senses the touch region of the touch. In an embodiment, the processor 110 determines the touch region according to whether the capacitance variation of a plurality of sensing pads corresponding to the touch exceeds a threshold value.

In an embodiment, the processor 110 senses a static contact area and a static contact position via the touchpad 120 when the touch is static. "The touch is static" means that the amount of a movement of the touch is lower than a variation threshold. The static contact area is the area of the touch region when the touch is static. In one embodiment, the static contact position is calculated based on the capacitance variation on a plurality of sensing pads corresponding to the touch. In another embodiment, the static contact position is calculated based on the capacitance sensing density and the capacitance variation of a plurality of sensing pads corresponding to the touch.

Then, the processor 110 determines whether the user performs a click operation according to whether the static contact area exceeds an area threshold, and then determines whether to trigger the click operation accordingly.

In an embodiment, the area threshold is predetermined. The area threshold is determined based on a moving contact area of the touch. In this embodiment, the processor 110 senses the moving contact area when the touch moves and determines the area threshold according to the moving contact area. The moving contact area is the area of the touch region during the touch moves.

In an embodiment, the processor 110 determines whether the user performs a click operation according to whether the static contact area exceeds the area threshold, and the processor 110 further determines whether to trigger a click operation according to whether the shift of the static contact position of the touch exceeds a shift threshold. That is, if the shift of the static contact position of the touch exceeds the shift threshold, it is determined that the user slides a finger and the click operation is not triggered.

In an embodiment, the shift threshold is predetermined. In an embodiment, the shift threshold is determined according to the static contact area. In an embodiment, the shift threshold is substantially equal to the touch region of the touch in the static state. For example, when the static contact area of a touch exceeds the area threshold and the shift of the static contact position of the touch does not exceed the touch region of the touch in the static state, it is determined to trigger a click operation.

In an embodiment, the click operation is a left click operation or a right click operation, and other operations are also within the scope of the present disclosure.

Figure 2B:
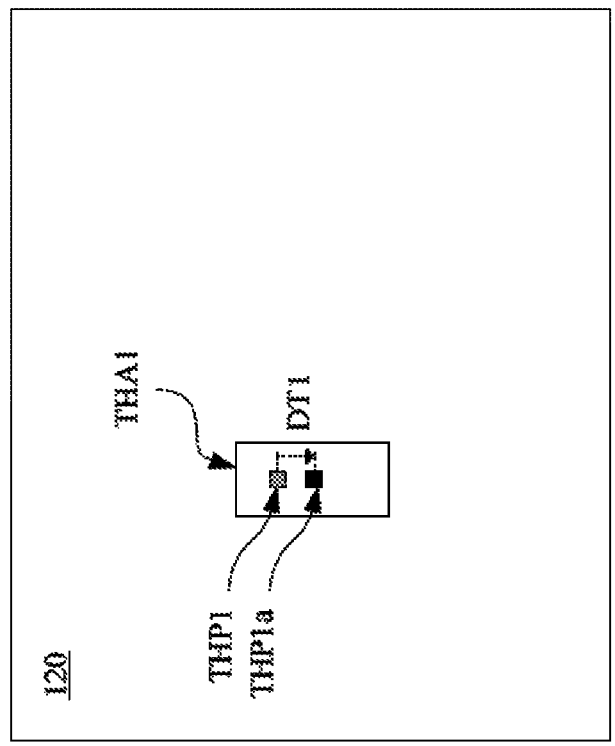
FIG. 2A and FIG. 2B are operation schematic diagrams of an electronic device in an embodiment.
Figure 2A:
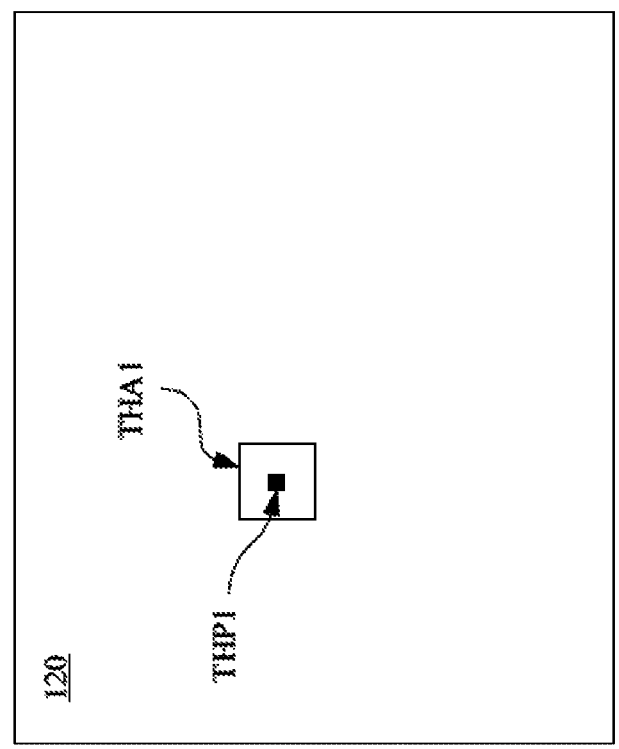

Referring to FIG. 2A, in an embodiment, the processor 110 senses a touch THA1 on the touchpad 120. The processor 110 senses the static contact position THP1 of the touch THA1 (such as a coordinate (1005, 226)) and the static contact area (such as 6 square millimeter) when the touch THA1 is static.

Then, referring to FIG. 2B, when the contact area of the touch THA1 increases and exceeds an area threshold (such as 7 square millimeter), and the static contact position THP1 shifts to a new static contact position THP1*a* (such as a coordinate (1120, 165)). The shift DT1 is less than the shift threshold, and the processor 110 triggers a click operation.

With the above operations, click operations are triggered effectively according to user's actions.

In addition, in an embodiment, since the processor 110 determines the area threshold and the shift threshold according to the moving contact area and the static contact area of a touch, the processor 110 is able to quickly change the area threshold and the shift threshold for different users and trigger the click operation more accurately.

In addition, in an embodiment, the processor 110 is used to sense two-point touch on the touchpad 120. The processor 110 senses a first touch and a second touch on the touchpad 120. The processor 110 senses the touch regions of the first and second touch. In an embodiment, the processor 110 determines the touch regions according to whether the capacitance variation on the sensing pads corresponding to the first and second touch exceeds a threshold value.

In an embodiment, when both the first touch and the second touch are static, the processor 110 senses the static contact areas and the static contact positions of both the first touch and the second touch via the touchpad 120. In an embodiment, the first touch is determined to be static when the amount of the movement of the first touch is lower than a first variation threshold, and the second touch is determined to be static when the amount of the movement of the second touch is lower than a second variation threshold. In an embodiment, the static contact area of the first touch is the area of the touch region of the first touch. The static contact position of the first touch is calculated according to the capacitance variation on the plurality of sensing pads corresponding to the first touch. In another embodiment, the static contact position of the first touch is calculated according to the capacitance sensing density and the capacitance variation on the plurality of sensing pads corresponding to the first touch. In an embodiment, the static contact position of the second touch is calculated according to the capacitance variation on the plurality of sensing pads corresponding to the second touch. In another embodiment, the static contact position of the second touch is calculated according to the capacitance sensing density and the capacitance variation on the plurality of sensing pads corresponding to the second touch.

In an embodiment, the processor 110 determines that the first touch and the second touch are a left touch or a right touch, respectively, according to the static contact position of the first touch and the static contact position of the second touch. For example, when the static contact position of the first touch is more close to the left side of the touchpad 120 than that of the second touch (for example, the x coordinate of the static contact position of the first touch is smaller than the x coordinate of the static contact position of the second touch), the first touch is the left touch and the second touch is a right touch; when the static contact position of the first touch is more close to the right side of the touchpad 120 than that of the second touch (for example, the x coordinate of the static contact position of the first touch is larger than the x coordinate of the static contact position of the second touch), the first touch is a right touch and the second touch is a left touch.

In addition, in an embodiment, the processor 110 determines whether to perform a first click operation corresponding to the first touch according to whether the static contact area of the first touch exceeds the first area threshold. In an embodiment, when the first touch is a left touch, the first click operation is a left click operation of a mouse, and when the first touch is a right touch, the first click operation is a right click of a mouse.

In an embodiment, the first area threshold is predetermined. In an embodiment, the first area threshold is determined according to the moving contact area of the first touch. In the embodiment, the processor 110 senses the moving contact area of the first touch when the first touch moves, and determines the first area threshold according to the moving contact area of the first touch. The moving contact area of the first touch is the area of the touch region during the first touch moves.

In an embodiment, the processor 110 determines whether the first click operation is performed according to whether the static contact area of the first touch exceeds the first area threshold, and the processor 110 further determines whether the first click operation is triggered according to whether the shift of the static contact position of the first touch exceeds the first shift threshold. That is, if the shift of the static contact position of the first touch exceeds the first shift threshold, it is determined that the user is sliding a finger instead of performing a click operation.

In an embodiment, the first shift threshold is predetermined. In an embodiment, the first shift threshold is determined according to the static contact area of the first touch. In an embodiment, the first shift threshold is substantially equal to the touch region of first touch in the static state. For example, when the static contact area of the first touch exceeds the area threshold and the shift of the static contact position of the first touch does not exceed the touch region of the first touch in the static state, it is determined to trigger the first click operation.

Similarly, the processor 110 determines a second click operation corresponding to the second touch according to whether the static contact area of the second touch exceeds the second area threshold. In an embodiment, the second click operation is different from the first click operation. In an embodiment, when the second touch is a left touch, the second click operation is a left click operation of a mouse; and when the second touch is a right touch, the second click operation is a right click of a mouse.

In an embodiment, the second area threshold is predetermined. In an embodiment, the second area threshold is determined according to the moving contact area of the second touch. In the embodiment, the processor 110 senses the moving contact area of the second touch when the second touch moves, and determines the second area threshold according to the moving contact area of the second touch. The moving contact area of the second touch is the area of the touch region during the second touch moves. In an embodiment, the second area threshold is adjusted according to one or more moving contact areas captured during the movement of the second touch.

In an embodiment, the processor determines whether the second click operation is performed according to whether the static contact area of the second touch exceeds the second area threshold, and the processor 110 further determines whether the second click operation is triggered according to whether the shift of the static contact position of the second touch exceeds the second shift threshold. That is, if the shift of the static contact position of the second touch exceeds the second moving threshold, it is determined that the user is sliding finger instead of performing a click operation.

In an embodiment, the second shift threshold is predetermined. In an embodiment, the second shift threshold is determined according to the static contact area of the second touch. In an embodiment, the second shift threshold is substantially equal to the touch region of the second touch in the static state. For example, when the static contact area of the second touch exceeds the area threshold and the shift of the static contact position of the second touch does not exceed the touch region of the second touch in the static state, it is determined to trigger the second click operation.

Figure 3B:
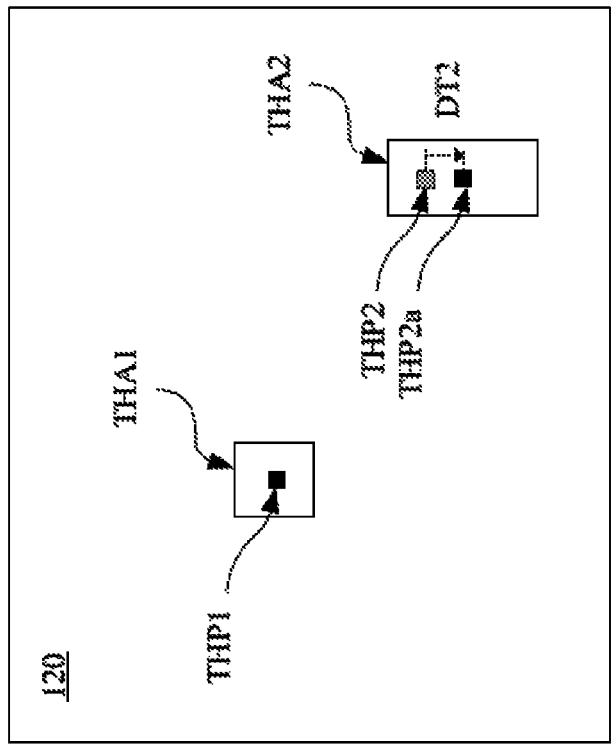
FIG. 3A and FIG. 3B are operation schematic diagrams of an electronic device in another embodiment.
Figure 3A:
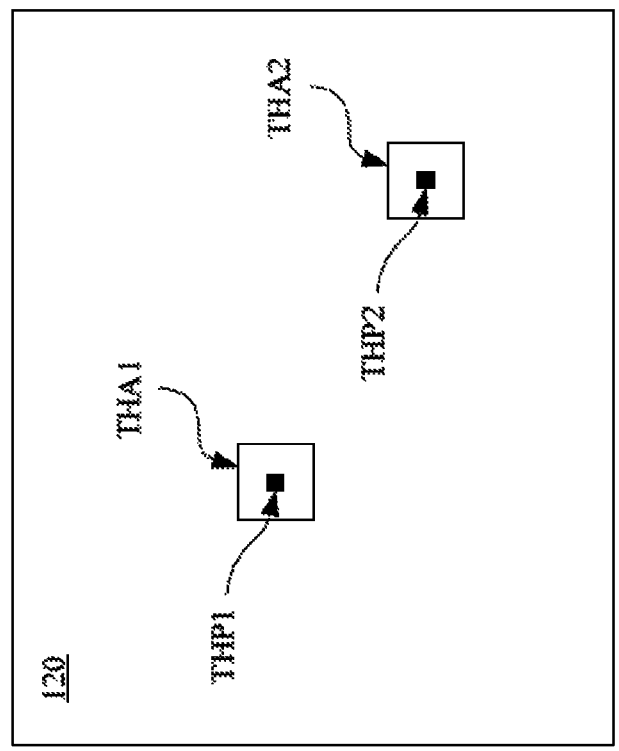

Referring to FIG. 3A, in an embodiment, the processor 110 senses a touch THA1 and a touch THA2 on the touchpad 120. When both the touch THA1 and the touch THA2 are static, the processor 110 senses the static contact position THP1 (such as a coordinate (2607, 690)) and the static contact area (such as 6 square millimeter) of the touch THA1, and the static contact position THP2 (such as a coordinate (2213, 561)) and the static contact area (such as 7 square millimeter) of the touch THA2.

In this embodiment, the processor 110 determines that the touch THA1 is a left touch and the touch THA2 is a right touch according to the static contact position THP1 of the touch THA1 and the static contact position THP2 of the touch THA2.

Then, referring to FIG. 3B, when the static contact area of the second touch THA2 increases and exceeds the second area threshold (for example, 8 square millimeter), and the static contact position THP2 shifts to a new static contact position THP2a (for example, a coordinate (2220, 512)), and the shift DT2 does not exceed the second moving threshold, then the processor 110 triggers the second click operation.

Through the above operations, different click operations are triggered effectively according to user's actions.

In addition, since the processor 110 is able to update the first area threshold and the first shift threshold according to the moving contact area and the static contact area of the first touch, and update the second area threshold and the second shift threshold according to the moving contact area and the static contact area of the second touch. The processor 110 is able to quickly update the first and second area thresholds and the first and second shift thresholds to trigger the click operation more accurately for different users.

The details of the present application will be provided below with the touch controlling method of the electronic device in FIG. 4, which is not limited to the following examples.

Figure 4:
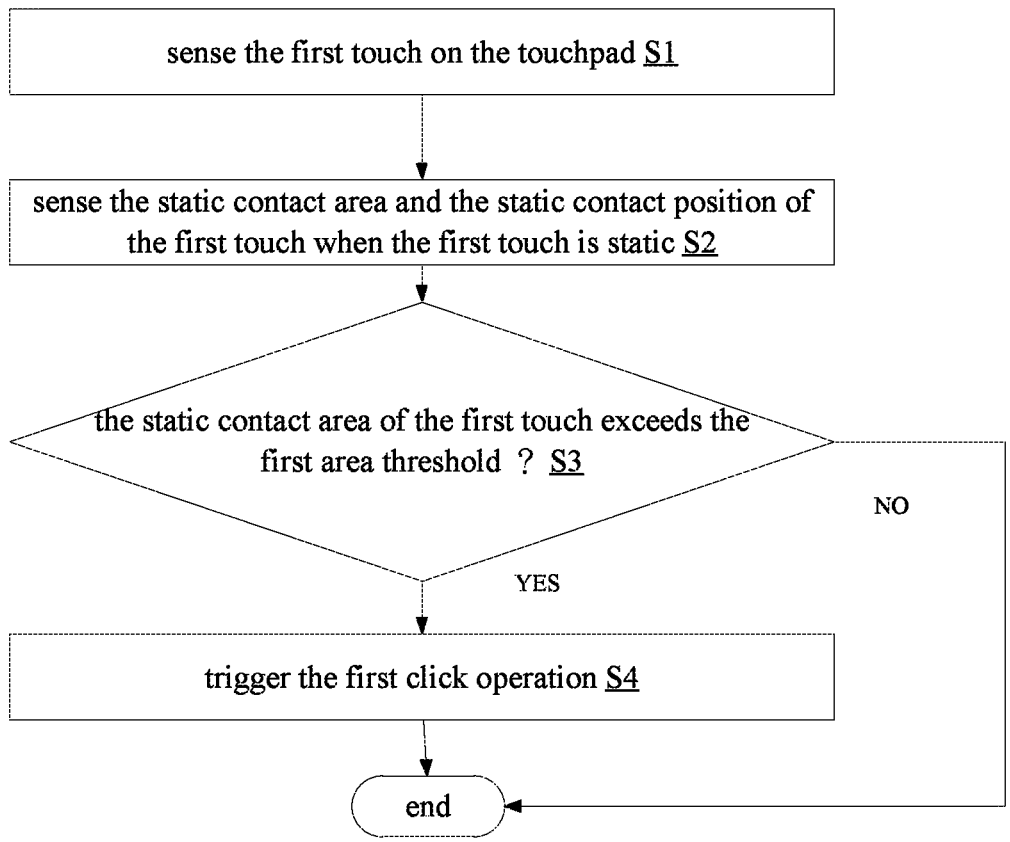
FIG. 4 is a flowchart of a touch controlling method in an embodiment.

FIG. 4 is a flowchart of a touch controlling method 200 according to an embodiment. In some embodiments, the process of the touch controlling method 200 described below is implemented by a non-transitory computer-readable recording medium. The non-transitory computer-readable recording medium records at least one program instruction. After the program instructions are loaded into an electronic device having or electrically connected with a touchpad, the following steps are performed. The touch controlling method 200 can be applied to an electronic device that is the same or similar to the electronic device shown in FIG. 1. In order to simplify the description, the following describes the method taking the electronic device 100 in FIG. 1 for example, which is not limited herein.

It should be understood that the sequence of steps of the touch controlling method mentioned in the embodiment can be adjusted according to actual requirements, and all or part of the steps can be performed at the same time, unless otherwise specified.

Moreover, in different embodiments, these steps can also be adaptively added, replaced, and/or omitted.

In an embodiment, the touch controlling method 200 includes the following steps:

In step S1, the processor 110 senses a first touch on the touchpad 12.

In step S2, the processor 110 senses the static contact area and the static contact position of the first touch through the touchpad 120 when the first touch is static.

In step S3, the processor 110 determines whether the static contact area of the first touch exceeds the first area threshold. If YES, step S4 is performed. If NO, the process ends.

In an embodiment, in step S3, the processor 110 determines whether the static contact area of the first touch exceeds the first area threshold, and the processor 110 further determines whether the shift of the static contact position of the first touch does not exceeds the shift threshold. If both are YES, step S4 is performed. If any one of them is NO, the process ends.

In step S4, when the static contact area of the first touch exceeds the first area threshold, the processor 110 triggers the first click operation. In an embodiment, the first click operation is a left click operation of a mouse or a right click operation of a mouse.

In an embodiment, in step S4, when the static contact area of the first touch exceeds the first area threshold and the shift of static touch position of the first touched does not exceed the first moving threshold, the processor 110 triggers the first click operation.

For details of the method 200, please refer to the foregoing paragraphs, which are not described here.

In the following, more specific details are provided by the touch controlling method of the electronic device in FIG. 5, which is not limited to the following examples.

Figure 5:
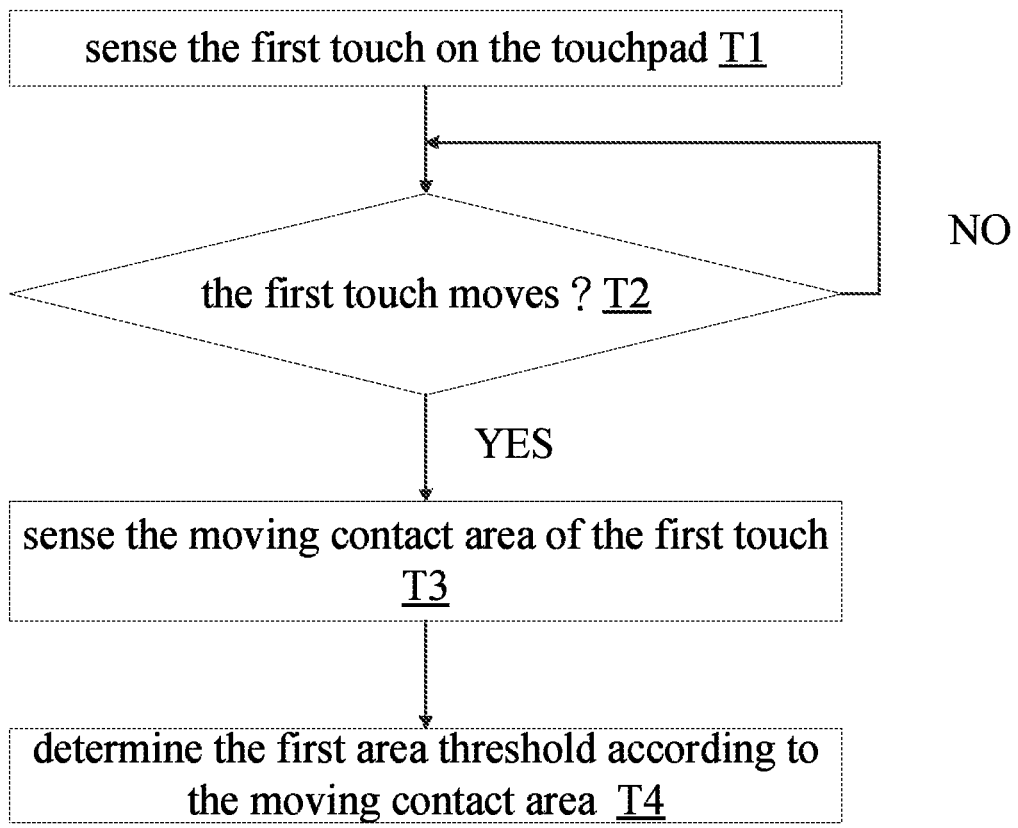
FIG. 5 is a flowchart of a touch controlling method in an embodiment.

FIG. 5 is a flowchart of a touch controlling method 300 of an electronic device according to an embodiment. The touch controlling method 300 can be applied to an electronic device that is same or similar to the electronic device shown in FIG. 1. In order to simplify the description, the following describes the method according to an embodiment of the present disclosure taking the electronic device 100 in FIG. 1 for example, which is not limited.

It should be understood that the sequence of steps of the touch controlling method mentioned in the embodiment can be adjusted according to actual requirements, and all or part of the steps can be performed at the same time, unless otherwise specified.

Moreover, in different embodiments, these steps can also be adaptively added, replaced, and/or omitted.

In an embodiment, the touch controlling method 300 includes the following steps.

In step T1, the processor 110 senses the first touch on the touchpad 120.

In step T2, the processor 110 determines whether the first touch moves or not. If YES, step T3 is performed. If NO, proceed to step T2.

In an embodiment, when the processor 110 determines that the first touch has not moved (static as aforementioned), the processor 110 performs the step T2 and its subsequent steps.

In step T3, the processor 110 senses the moving contact area of the first touch. In an embodiment, the moving contact area is the area of the touch region of the first touch in movement.

In step T4, the processor 110 determines the first area threshold according to the moving contact area of the first touch.

For details of the method 300, please refer to the foregoing paragraph, so it is not repeated here.

Through the above operation, the processor 110 quickly updates the area threshold and the shift threshold to trigger the click operation more accurately for different users.

Figure 6:
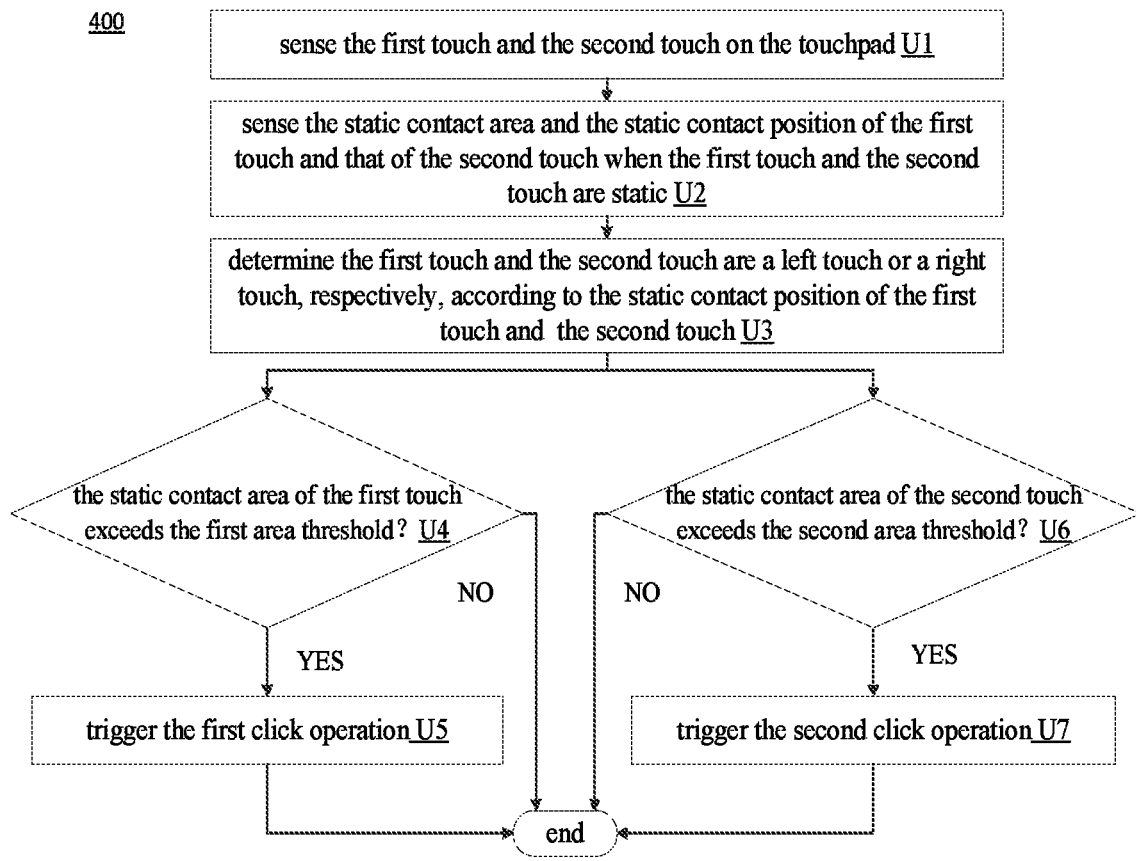
FIG. 6 is a flowchart of a touch controlling method in an embodiment.

FIG. 6 is a flowchart of a touch controlling method 400 of an electronic device according to an embodiment. The touch controlling method 400 can be applied to an electronic device that is same or similar to the electronic device shown in FIG. 1. In order to simplify the description, the following describes the method according to an embodiment of the present disclosure using the electronic device 100 in FIG. 1 as an example, which is not limited.

It should be understood that the sequence of steps of the touch controlling method mentioned in the embodiment can be adjusted according to actual requirements, and all or part of the steps can be performed at the same time, unless otherwise specified.

Moreover, in different embodiments, these steps can also be adaptively added, replaced, and/or omitted.

In an embodiment, the touch controlling method 400 includes the following steps.

In step U1, the processor 110 senses the first touch and the second touch on the touchpad 120.

In step U2, the processor 110 senses the static contact area and static contact position of the first touch, and the static contact area and static contact position of the second touch when the first touch and the second touch are static.

In step U3, the processor 110 determines the first touch and the second touch are a left touch or a right touch, respectively, according to the static contact position of the first touch and the static contact position of the second touch.

In step U4, after step U3, the processor 110 determines whether the static contact area of the first touch exceeds the first area threshold or not. If YES, proceed to step U5. If NO, the process ends.

In an embodiment, in step U4, the processor 110 determines whether the static contact area of the first touch exceeds the first area threshold, and the processor 110 further determines whether the shift of the static contact position of the first touch does not exceed the shift threshold. If both are YES, step U5 is performed. If any one of them is NO (if the movement of the static contact position of the first touch exceeds the moving threshold), the process ends.

In step U5, when the static contact area of the first touch exceeds the first area threshold, the processor 110 triggers the first click operation. In an embodiment, a left touch or a right touch is corresponding to the first touch, and the first click operation is a left click operation of a mouse or a right click operation of a mouse.

In an embodiment, in step U5, when the static contact area of the first touch exceeds the first area threshold and the shift of the static contact position of the first touch does not exceed the first shift threshold, the processor 110 triggers the first click operation.

In step U6, after step U3, the processor 110 determines whether the static contact area of the second touch exceeds the second area threshold. If YES, proceed to step U7. If NO, the process ends.

In an embodiment, in step U6, the processor 110 determines whether the static contact area of the second touch exceeds the second area threshold, and the processor 110 further determines whether the shift of the static contact position of the second touch does not exceed the moving threshold. If both are YES, step U7 is performed. If any one of them is NO (if the movement if the static contact position of the second touch exceeds the moving threshold), the process ends.

In step U7, when the static contact areas of the first and second touch exceed the second area threshold, the processor 110 triggers the second click operation. In an embodiment, the second touch is a left touch or a right touch, and the second click operation is a left click operation of a mouse or a right click operation of a mouse.

In an embodiment, in step U7, the processor 110 triggers the second click operation when the static contact area of the second touched exceeds the second area threshold and the shift of the static contact position of the second touched does not exceed the second shift threshold.

For details of the method 400, please refer to the foregoing paragraphs, which are not described herein.

With the above operations, click operations are triggered effectively according to user's actions.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, including a processor that is electronically connected with a touchpad and configured to perform steps of:

sensing a first touch on the touchpad;
sensing a static contact area of the first touch when the first touch is static; and
triggering a first click operation when the static contact area of the first touch exceeds a first area threshold;
wherein the processor is further configured to perform steps including:
sensing a second touch on the touchpad;
sensing a static contact area of the second touch when the first touch and the second touch are static; and
triggering a second click operation when the static contact area of the second touch exceeds a second area threshold;
wherein the first touch is determined to be static when an amount of movement of the first touch is lower than a first variation threshold, and the second touch is determined to be static when an amount of movement of the second touch is lower than a second variation threshold.

2. The electronic device according to claim 1, wherein the processor is further configured to perform steps including:

sensing a moving contact area of the first touch when the first touch is in movement; and
determining the first area threshold based on the moving contact area.

3. The electronic device according to claim 1, wherein the processor is further configured to perform steps including:

sensing a static contact position of the first touch when the first touch is static; and triggering the first click operation when the static contact area of the first touch exceeds the first area threshold and a shift of the static contact position of the first touch does not exceeds a shift threshold.

4. The electronic device according to claim 3, wherein the processor is further configured to perform steps including:

determining the shift threshold according to the static contact area.

5. A touch controlling method, applied to an electronic device electrically connected to a touchpad, the touch controlling method comprising:

sensing a first touch on the touchpad;

sensing a static contact area of the first touch when the first touch is static;

triggering a first click operation when the static contact area of the first touch exceeds a first area threshold;

sensing a second touch on the touchpad;

sensing a static contact area of the second touch when the first touch and the second touch are static; and triggering a second click operation when the static contact area of the second touch exceeds a second area threshold;

wherein the first touch is determined to be static when an amount of movement of the first touch is lower than a first variation threshold, and the second touch is determined to be static when an amount of movement of the second touch is lower than a second variation threshold.

6. The touch controlling method according to the claim 5, further comprising:

sensing a moving contact area of the first touch when the first touch is in movement; and determining the first area threshold based on the moving contact area.

7. The touch controlling method according to the claim 5, further comprising:

sensing a static contact position of the first touch when the first touch is static; and triggering the first click operation when the static contact area of the first touch exceeds the first area threshold and a shift of the static contact position of the first touch does not exceeds a shift threshold.

8. The touch controlling method according to the claim 7, further comprising:

determining the shift threshold according to the static contact area.

9. A non-transitory computer-readable recording medium, recording at least one program instruction, after the program instructions are loaded into an electronic device having or electrically connected with a touchpad, the electronic device performs steps of:

sensing a first touch on the touchpad;

sensing a static contact area of the first touch when the first touch is static; and triggering a first click operation when the static contact area of the first touch exceeds a first area threshold;

wherein the electronic device is further configured to perform steps including:

sensing a second touch on the touchpad;

sensing a static contact area of the second touch when the first touch and the second touch are static; and triggering a second click operation when the static contact area of the second touch exceeds a second area threshold;

wherein the first touch is determined to be static when an amount of movement of the first touch is lower than a first variation threshold, and the second touch is determined to be static when an amount of movement of the second touch is lower than a second variation threshold.

* * * * *